(12) United States Patent
Pyhalammi et al.

(10) Patent No.: US 10,146,513 B2
(45) Date of Patent: Dec. 4, 2018

(54) END-TO-END SOLUTION FOR AN END-USER TO OBTAIN DESIRED INFORMATION IN USER INTERFACES

(75) Inventors: Seppo Pyhalammi, Helsinki (FI); Kaj Haggman, San Francisco, CA (US); Timo Yliniemi, Espoo (FI); Tero-Markus Saarimaa, Helsinki, CA (US); Tuomo Sihvola, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1870 days.

(21) Appl. No.: 12/161,478

(22) PCT Filed: Jan. 12, 2007

(86) PCT No.: PCT/IB2007/000095
§ 371 (c)(1),
(2), (4) Date: Jan. 10, 2011

(87) PCT Pub. No.: WO2007/083210
PCT Pub. Date: Jul. 26, 2007

(65) Prior Publication Data
US 2011/0099487 A1    Apr. 28, 2011

Related U.S. Application Data

(60) Provisional application No. 60/760,938, filed on Jan. 23, 2006.

(51) Int. Cl.
*G06F 3/00* (2006.01)
*G06F 8/38* (2018.01)

(52) U.S. Cl.
CPC ...................... *G06F 8/38* (2013.01)

(58) Field of Classification Search
CPC ............. G06F 21/604; G06F 17/30867; G06F 17/30817; G06F 17/30017;
(Continued)

(56) References Cited

U.S. PATENT DOCUMENTS 6,054,983 A    4/2000  Simonoff et al.
6,639,142 B2 * 10/2003 Takahashi ................ G10H 7/02
                                                    84/603
(Continued)

FOREIGN PATENT DOCUMENTS

EP    0 853 287 A2    7/1998
EP    1 187 038 A2    3/2002
(Continued)

OTHER PUBLICATIONS

WO 03/067427 A2, Buckland et al. Published Aug. 14, 2003.*
(Continued)

*Primary Examiner* — Di Xiao
(74) *Attorney, Agent, or Firm* — Alston & Bird LLP

(57) ABSTRACT

Provided are apparatuses and methods in a digital broadcast transmission system for providing user interfaces to a mobile device. The user interfaces (e.g., "widgets") may provide information to a mobile device user by displaying the interfaces in a predetermined location on a mobile device display. For example, the user interfaces may be displayed on a dashboard on a mobile device and may contain updated information. As information pertaining to content of the user interfaces changes, the status of the information in the user interfaces may change accordingly. In one example, an event user interface may provide information pertaining to the event and may be updated based on changes to the event. For example, the number of participants may change. This information may be provided in the user interface. In addition, user interfaces may be selected, modified, arranged, organized or otherwise manipulated at a server and downloaded to the mobile device.

28 Claims, 20 Drawing Sheets

(58) Field of Classification Search
CPC ......... G06F 17/30029; G06F 17/30058; G06F 3/04817; G06F 3/0482; G06F 3/04883; G06F 3/0488; G06F 3/04842; G06F 3/14; G06F 3/0416; G06F 3/016; G06F 3/04847; G06F 3/0481; G06Q 10/101; G06Q 10/103
USPC .................................................. 715/760–763
See application file for complete search history.

(56) References Cited

U.S. PATENT DOCUMENTS

| | | | |
|---|---|---|---|
| 7,441,020 B2* | 10/2008 | Dideriksen et al. .......... 709/221 | |
| 7,707,514 B2* | 4/2010 | Forstall ................. G06F 3/0486 | 715/741 |
| 7,778,239 B2* | 8/2010 | Furukawa ..................... 370/352 | |
| 7,996,514 B2* | 8/2011 | Baumert ............... G06F 1/1632 | 709/203 |
| 8,117,639 B2* | 2/2012 | MacKinnon ........ H04L 63/0263 | 713/156 |
| 8,271,346 B1* | 9/2012 | Smith ........................... 705/26.1 | |
| 2004/0158638 A1* | 8/2004 | Peters .............. H04M 1/72519 | 709/227 |
| 2004/0199635 A1* | 10/2004 | Ta ...................... H04L 12/5695 | 709/226 |
| 2005/0039134 A1* | 2/2005 | Wiggeshoff ........... G06F 9/4443 | 715/752 |
| 2005/0114777 A1* | 5/2005 | Szeto ................. G06Q 10/109 | 715/710 |
| 2006/0015818 A1* | 1/2006 | Chaudhri et al. ............. 715/779 | |
| 2006/0242573 A1 | 10/2006 | Hu et al. | |
| 2007/0038712 A1* | 2/2007 | Affronti ................. G06Q 10/06 | 709/206 |
| 2007/0044029 A1* | 2/2007 | Fisher et al. .................. 715/762 | |
| 2007/0162850 A1* | 7/2007 | Adler et al. .................. 715/700 | |
| 2009/0017578 A1* | 1/2009 | Walther .................. B41F 17/00 | 438/106 |
| 2010/0287092 A1* | 11/2010 | Colman ............... G06Q 40/025 | 705/38 |

FOREIGN PATENT DOCUMENTS

| | | |
|---|---|---|
| WO | 03/067427 A2 | 8/2003 |
| WO | 03067427 A2 | 8/2003 |
| WO | WO 03067427 A2 | 8/2003 |

OTHER PUBLICATIONS

Notification Concerning Transmittal of International Preliminary Report on Patentability and Written Opinion for International Application No. PCT/IB2007/000095, dated Aug. 7, 2008, 8 pages.
Supplementary European Search Report for Application No. EP07705430.2 dated Dec. 10, 2008, 4 pages.
UIML: An XML Language for Building Device-Independent User Interfaces:, Marc Abrams and Contantinos Phanouriou, Proceedings of XML, XX, XX, Dec. 1, 1999, 20 pages.
European Office Action dated Feb. 6, 2009, for Application No. 07 705 430.2, 6 pages.
International Search Report for PCT/IB2007/000095, completed on Jul. 3, 2007 and dated Jul. 6, 2007, 3 pages.
Office Action of corresponding Russian Patent Application No. 2008128550/09(035173) dated Feb. 16, 2010, Russia, pp. 1-7.
Summons to attend oral proceedings pursuant to Rule 115(1) EPC for European 07705430.2 dated May 22, 5017, 7 pages.
Notice of Intent to Grant for European Application No. 07705430.2 dated Dec. 14, 2017, 12 pages.
Notice of Grant for European Application No. 07705430.2 dated Apr. 26, 2018, 2 pages.

* cited by examiner

END-TO-END SOLUTION FOR AN END-USER TO OBTAIN DESIRED INFORMATION IN USER INTERFACES

CROSS REFERENCE TO RELATED APPLICATIONS

This application claims the benefit of U.S. Provisional Application No. 60/760,938, filed on Jan. 23, 2006, and which is incorporated herein by reference.

FIELD OF ART

Embodiments of the invention relate generally to communications networks. More specifically, embodiments of the invention provides for providing up-to-date information in a communication network.

BACKGROUND

Users of mobile devices typically expect to receive up-to-date information at any time. However, unlike computers with large display devices, a mobile device is typically limited in the ability of displaying multiple sources of information or information in a variety of views. In addition, input devices of a typical mobile device further limit access to up-to-date information because input to a mobile device often requires an excessive number of keystrokes or other manipulation. Also, information may not display properly on a small screen of a mobile device if the information is designed for larger display areas.

Access to multiple events or sites on a mobile device has also been problematic. For example, if a user desires news or other information from multiple internet sites, the mobile device would often have to download the desired web pages repeatedly to receive updated information which often results in delays. Also, because connection fees may be excessive for certain applications that are always on in a mobile device, always-on applications in packet data network connections have been seen to have problems in maintaining a connection while minimizing the amount of data transferred. Also the services user is interest there is a need to provide a way of user can define the services in form he wants to receive them.

Thus, there exists a need for a method and system for providing efficient access to information on a mobile device. There is also a need to provide filter information for data flows as well as tools to select desired content.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a method is provided for providing information or user interfaces on a mobile device. For example, a user interface may include information that may be updated. The user interface may be configured on a server and downloaded to the mobile device. Information in the user interface may be updated.

In another example, a computer device or server device provides information or user interfaces to a mobile device. For example, the server device may provide user interfaces and receive a selection of user interfaces for downloading to a mobile device. Also, the server device may create user interfaces or organize and arrange user interfaces based on input received. Also, in another example, a dashboard configuration may be shared with friends or other contacts/peers.

In another example, a computer-readable medium is provided containing instructions for selecting, modifying, creating, and/or organizing user interfaces corresponding to desired information. The user interfaces and corresponding information may be downloaded to a mobile device.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
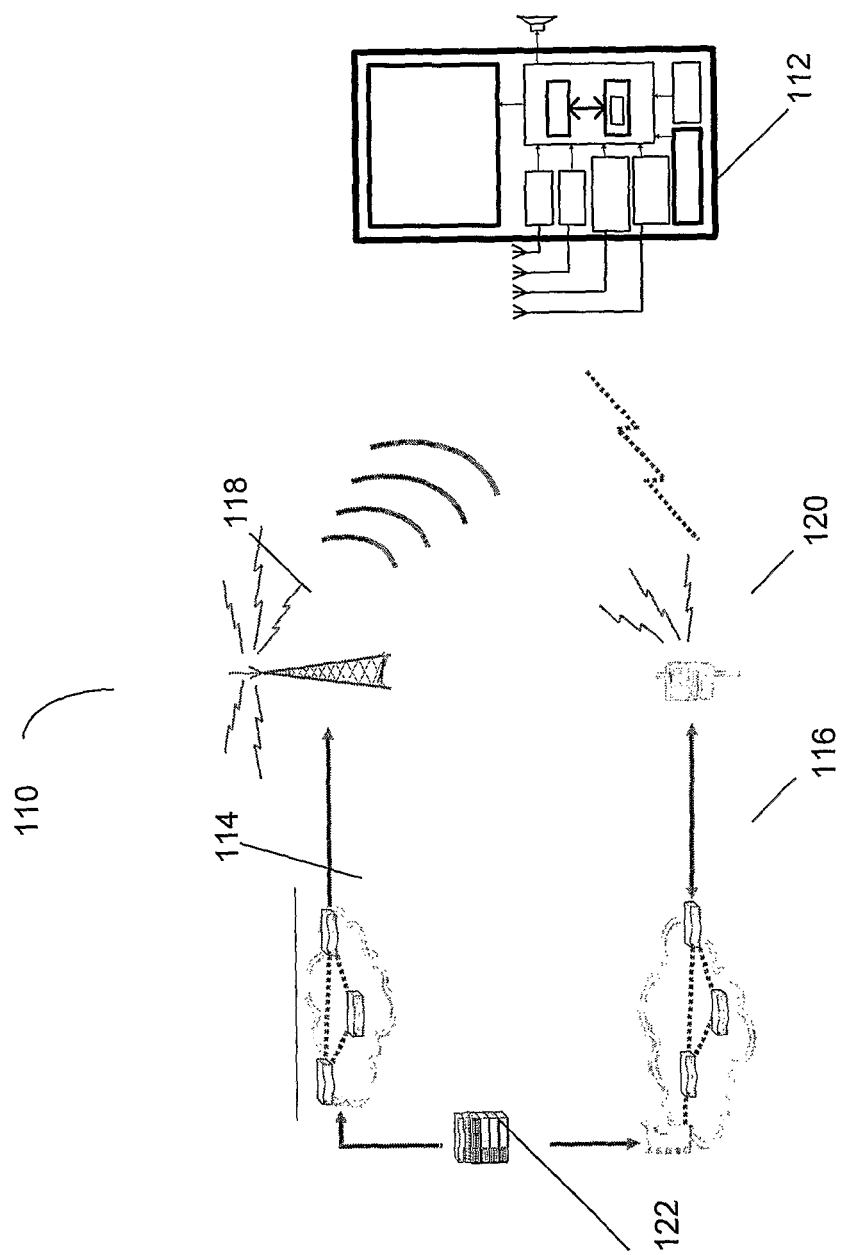
FIG. 1 illustrates a block diagram of a wireless communication system in which various embodiments may be implemented.

Aspects of the present invention may be utilized across a broad array of networks and communication protocols. FIG. 1 illustrates an example of a wireless communication system 110 in which systems and methods according to at least some embodiments may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 (which may include the internet or similar network) and/or cellular network 116. The mobile terminal/device 112 may comprise a digital broadband broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, may be incorporated into the TS. This enables a receiver device to correctly process the data contained within the TS.

Aspects of the present invention, however, are also is applicable to other traditional digital mobile broadcast systems such as, for example, T-DAB, T/S-DMB, ISDB-T, ATSC, MediaFLO, and non-traditional systems such 3GPP MBMS and 3GPP2BCMCS.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116 or utilizing both networks.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user input or selection (for example, in an interactive transmission), applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
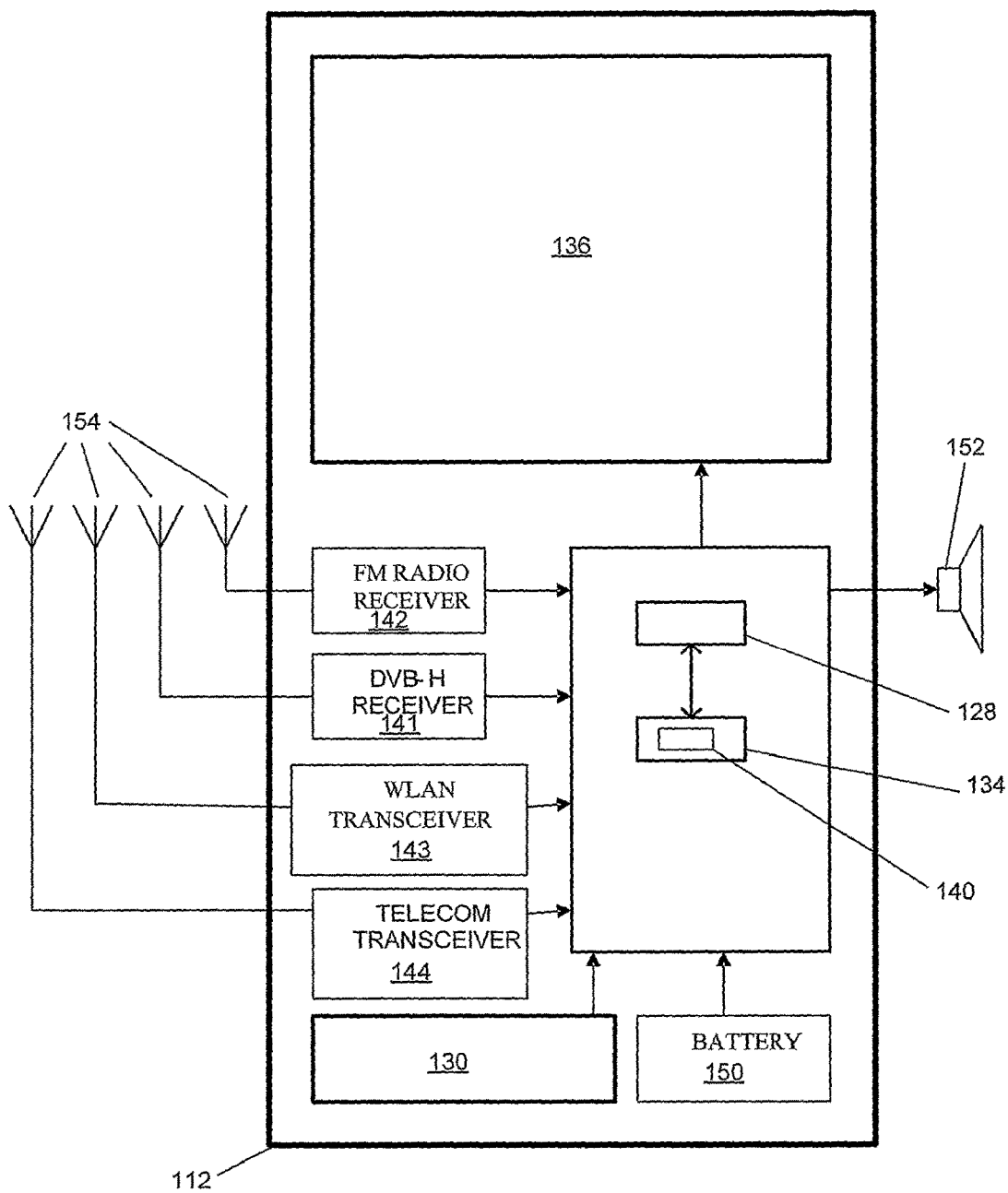
FIG. 2 illustrates a suitable digital broadcast receiver in which one or more illustrative embodiments may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, stylus, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation. The power of receiver between bursts may be turned off to reduce power consumption.

In one example of the present invention, a user of a mobile device may input desired data into the mobile device, organize the data within the mobile device, or display the information in a convenient manner. For example, a system for providing desired information in a mobile device may include a system API through which a third party may provide content to the mobile device. In addition, the system may include a widget API for providing a standardized interface for communication between a user interface display element containing or displaying desired information (i.e., a "widget"). The system API may communicate with the widget via the widget API, for example. Also, the widget may access information on the Internet via the widget API.

User interfaces for displaying or providing up-to-date information (i.e., "widgets") may be arranged on a display in a designated user interface or predetermined area on a display (e.g., a "dashboard"). The designated user interface, or dashboard, provides delivery of messages from the widget API to the service server. The dashboard may further include a dashboard API for providing access to mobile device resources and for presenting a user interface corresponding to a widget. The dashboard API may contain at least two parts. One part may be an API for the development of widgets such as design, placement on a display, content, etc. Another part of the dashboard API may be provided for third party developers. In another example, the dashboard API may be built over a mobile device operating system or over any other API available on the mobile device. In another example, the system may also include a mobile gateway for creating and maintaining mobile connections between a mobile device and a service.

In one example, on-line subscription services may be provided from a subscription server to a user of a mobile device through the Internet. The subscription server may receive from the mobile device user-specific information relating to capabilities of the mobile device, user preferences, or other user-related information. The information may be stored as well in the server. For example, the server may know the user's mobile device type and the related mobile device characteristics can be obtained from, for example, a manufacturers' site. The subscription server sends relevant information based on the user information to the mobile device and may receive a request from the mobile device from the user. For example, if a user wishes to purchase a downloadable product, the subscription service may download the desired product to the mobile device based on the request received from the user.

Figure 3:
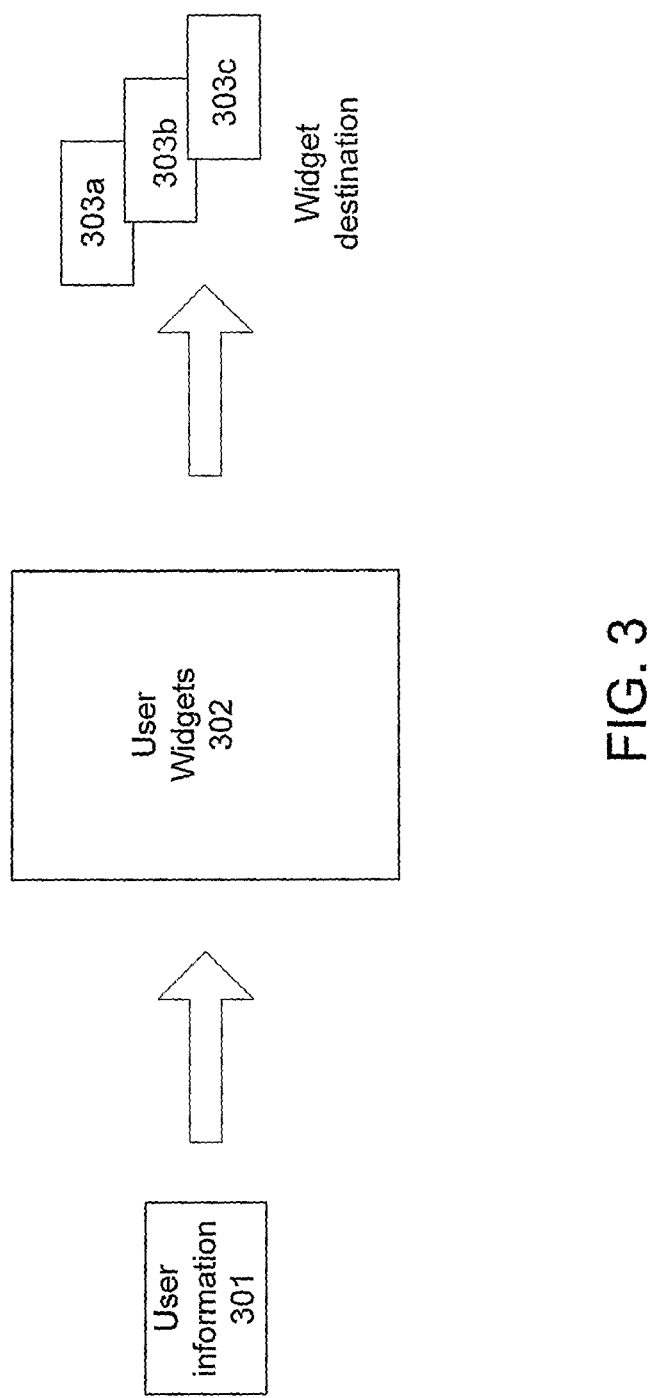
FIG. 3 illustrates an example of a high level architecture as one example of a server in which one or more illustrative embodiments may be implemented.

FIG. 3 illustrates an example of a high level architecture as one example of a server for providing widgets on a mobile device. In this example, user information 301 may be provided in a server. User information 301 may include any information describing the user or mobile device of the user, activities, events, etc. associated with the user. For example, the user information 301 may include a user registration database including a user identification, a phone number identifier, a mobile device identifier, a profile corresponding to the user, a list of contacts or friends of the user, message boards, invitations to groups, or recommendations of the user including people, events, activities, etc. The recommendations of the user stored in the server may further be arranged in any desired format such as but not limited to sorting by friends, hobbies, services being used or group identifiers.

The user information 301 may further be displayed or otherwise provided as a widget on a mobile device which may display or provide up-to-date information desired by a user. This up-to-date information may include any desired information including information that may change periodically. Such information may include for example late breaking news or other information which may be most relevant when updated. For example, user widgets 302 may provide a display of widgets associated with the user (e.g., selected by a user) and may include displays of user interfaces containing up-to-date information or images relevant to corresponding desired information. As examples, a widget may include quotes from a character of a television program, a shopping list, news reports, latest scores, bus schedules, etc. The widgets may be provided in the user widgets 302 module in a server. As one example, a user may obtain a list of widgets in a browser on, for example, the Internet. The user widgets 302 may further be selected, edited, updated, extended, or manipulated for selection in a mobile device.

A widget or group of widgets may be selected from the user widgets 302. The widgets may be sent to a widget destination (303a, 303b, 303c), of which three are illustrated in the example of FIG. 3. The widget destination (303a, 303b, 303c) may include, for example, a Rich Site Summary (RSS) feeder, a photo service or other server plug-ins. Server plug-ins may be used as a front-end to external services that the system uses. Data obtained from the external services may be provided for the system to further process and to prepare information for the widget API (to be delivered into mobile devices and so available for end-users). These are merely examples as any device capable of processing or displaying widgets may be used.

In another example, the server may include a parameter for defining when widgets may be forwarded to a user. In this example, a designated widget may be selected but may not be sent to a user until a specified period of time has elapsed as indicated by a parameter in the server. For example, widgets may be delivered to mobile devices after creation and/or configuration and the content used by that widget may be delivered as requested by the end-user to compromise refreshing period and data transfer costs. Alternatively, a designated widget may not be sent to a user until a specified time has been reached (as defined by a parameter in the server). Also, the amount of data sent to a user may be controlled. In this example, a parameter in the server may indicate a maximum (or minimum) amount of data to be sent to a user. When the maximum amount of data is sent, the system may cease to send data to a user until a specified period of time has elapsed or until a specified time is reached. In another example, information or widgets may be prioritized such that information may be sent in a desired prioritized order. Thus, connection costs may be minimized. Also information with high priority may need to be sent without any restrictions, e.g. a meeting or event is cancelled so that user can avoid unnecessary traveling. In one embodiment a widget interface e.g. dashboard identifier or widget identifier may be ranked as important ones and by ranking the widgets may be separated from each others. A possible way to rank is that specific widget numbers will ranked high so that the users when selecting widgets they know that the widget is ranked high.

Figure 4:
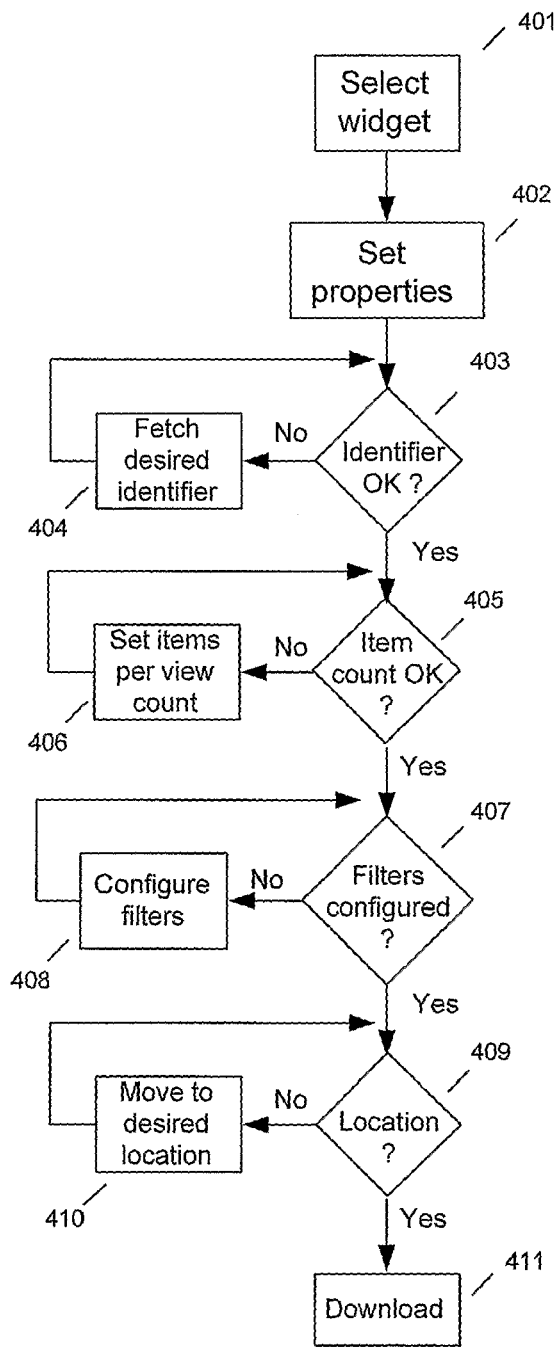
FIG. 4 is a flowchart illustrating an example of providing widgets according to one or more illustrative embodiments.

FIG. 4 is a flowchart illustrating an example of providing widgets according to an aspect of the present invention. In one example, the process is carried out in a server. In this example, a widget or a plurality of widgets may be selected or configured, for example, on a server. In STEP 401, a widget is selected. For example, a user may wish to include a widget in a dashboard on a mobile device. The user may access a server (e.g., via a web page) and may select from a list of widgets a widget to include on the mobile device. The selected widget may be opened and the properties may be provided. The user may further alter or set the properties of the widget (STEP 402). The user may also create a new widget by selecting a desired graphic or text information or may control the appearance, size, shape, etc. of the widget by setting desired properties of the widget. In another example, a widget identifier may be defined automatically by the server as a unique identifier of widget of the user. Identification of certain widgets may be facilitated by ranking of certain widgets over others. By that way also the order of widgets in the user device may be selected. However, the user may also change these orders based on his desires and needs. Usually the widget identifier of groups is the same for everyone in the group thus facilitating the administration. Also, predefined identifier sets may be assigned for specific groups. In one embodiment the widget identifier may also identify the location in the dashboard it will be shown by means of the order or further an additional field for the space may be generated so that, e.g., numbers such as (100, 100), for example, may identify the size and the coordinates (2500, 3000, 2600, 3100) space of the widget where it will appear in the dashboard. That can be previewed in the server so that the constructed dashboard view can be reasonable to download to the mobile device display. As an additional example, a widget may be placed in a dashboard such that an end-user may set a widget with a PC at a web site to a 'replica' of the dashboard and download the dashboard or the new location of the widget.

The user may further select the widget for an RSS feed or broadcast as described above. In this example, a URL for the RSS feed may be provided with the widget and may be compared to a desired URL (STEP 403). If the URL in this example is incorrect ("NO" branch of step 403), then the desired identifier (e.g., URL) may be obtained from the server. Also, the number of items displayed in the view of the widget may be set (STEP 405). If the item count is incorrect (the "NO" branch of STEP 405), then the item count may be set by the user (STEP 406). Otherwise ("YES" branch of STEP 405), the text filters (which may be applied in the server, for example) associated with the widget may be determined to be of a configuration as desired for the widget. If the text filters are not as desired ("NO" branch of STEP 407), then the text filters are configured (STEP 408). Also, the location of the widget may be determined (STEP 409). If the location of the widget is not as desired ("NO" branch of STEP 409), then the widget may be moved to a desired location (STEP 410). Otherwise ("YES" branch of STEP 409), the changes of the widget may be submitted and the widget may be downloaded to the mobile device (STEP 411). In an embodiment all widgets are structured and previewed on the server and then all widgets together are downloaded in one dashboard view. Alternatively, in changing and/or adding a single or few widgets, the widgets can be downloaded into the dashboard separately. Also an alternative is a differential update, where only changes to the web's 'dashboard replica' are downloaded into the mobile device. Thus widgets in the dashboard may have different addresses and interfaces towards the server and can be individually shown or receive and transmit messages over the mobile device input/output means. The user can arrange a filter to his device so that the widget and/or dashboard identifier is evaluated in the mobile device or in the server and then based on the criteria the respective widget or dashboard can be updated. Furthermore access to widget or dashboard can be limited by adding a password protection on the widget or dashboard or its objects in one embodiment. Then the widget or dashboard items can be encrypted and access allowed only with the valid password. This process may be accomplished either by a user in the server or in the mobile device, for example, to ensure that only an authorized user can access these widgets or dashboards. As it can be understood also user may have one or more dashboards and or different dashboards on his/her different mobile device. Again, the mobile device may have two or more dashboards based on the activities and/or functionalities. A user may hop between dashboards as he/she hops between widgets.

Figure 5:
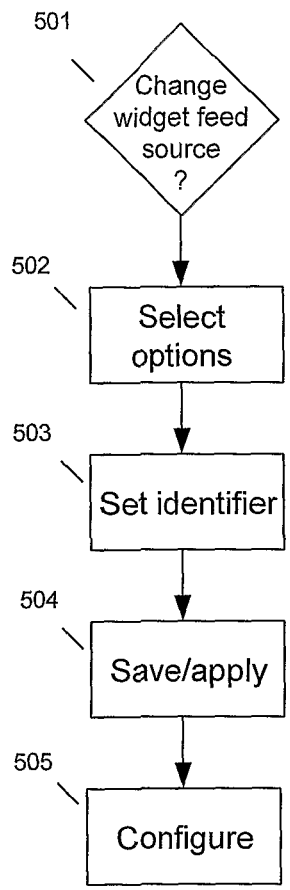
FIG. 5 is a flowchart illustrating changing a feed source and configuring a widget on a mobile device according to one or more illustrative embodiments.

FIG. 5 is a flowchart illustrating changing a feed source and configuring a widget on a mobile device. In one example, the process illustrated in FIG. 5 is carried out in a mobile device. In this example, a change in the feed source of a widget may be desired by a user at a mobile device (STEP 501). The user may select options corresponding to the widget (STEP 502). For example, a user may select a URL corresponding to the widget from a menu. The user may also select options associated with the widget such as desired properties of the widget or a configuration of the widget. An identifier (e.g., a URL for an RSS feed) may be set (STEP 503), the identifier corresponding to the widget. Also, the parameters associated with the widget may be saved and modifications to properties or parameters associated with the widget may be applied to the widget. The widget may be configured (STEP 505) according to the indicated parameters and specified URL. In one embodiment, the address may further indicate a corresponding service to the user (e.g., a "Yellow Pages service"). Also, the service indicated by the address may change corresponding to a change in the location of the mobile device. Thus, the mobile device may have the most appropriate list of phone numbers applicable in that location such that, for example, queries of a user may be obtained easily, quickly and conveniently. Further, corresponding links may also change as listing on a menu change. This may provide a user with the latest information of a menu. Also, in another example, only the portions of a widget that have changed may be replaced in the widget. Thus the widget may have a detailed map of its items that may identify the locations of the items such that the items may be easily replaced, if necessary. The message may also contain the coordinates of the widget items therein and knows where to put the replacing items.

Figure 6:
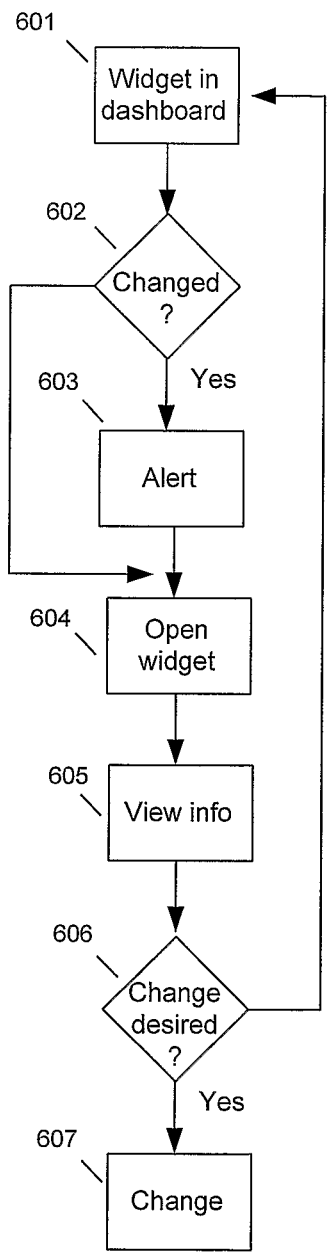
FIG. 6 is a flowchart illustrating widget participation in accordance with one or more illustrative embodiments.

FIG. 6 is a flowchart illustrating widget participation according to one aspect of the present invention. In one example, participation in an event or a game, for example, may be indicated (i.e., attending/participating or not). In another example, the process occurs in a mobile device. In an example of the process, a widget may be displayed in a dashboard on a display of a mobile device (STEP 601). Changes may be made to the content of the widget. If changes are made ("YES" branch of STEP 602), then an alert (STEP 603) may be displayed in the widget pertaining to the changes made. For example, a status of the event may have changed or members may have changed, etc. If the participating members have changed, the number of participants may be displayed in a minimized widget view. In one embodiment a counter is integrated e.g. to the widget in order to calculate the numbers answered etc. In STEP 604, the widget may be opened and detailed information about the event associated with the widget may be provided (STEP 605). Also, the user's participation may be presented in the widget. If the user wishes to change his status ("YES" branch of STEP 606), such as changing a status from "join" to "absence", then the change may be implemented in the mobile device (STEP 607). For example, a user may select join or absence, accordingly, to change his commitment to the event. Thus the counter may change the displays of members accordingly after the join or absence answer is reached at the server.

Figure 7:
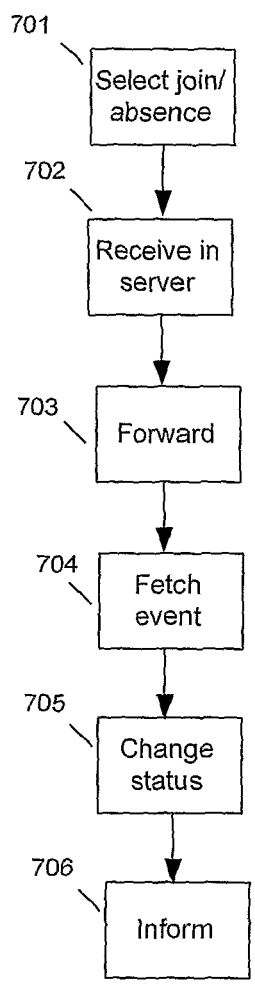
FIG. 7 illustrates an example of a method of joining an event by selection of a widget corresponding to a widget on the mobile device according to one or more illustrative embodiments.
Figure 8:
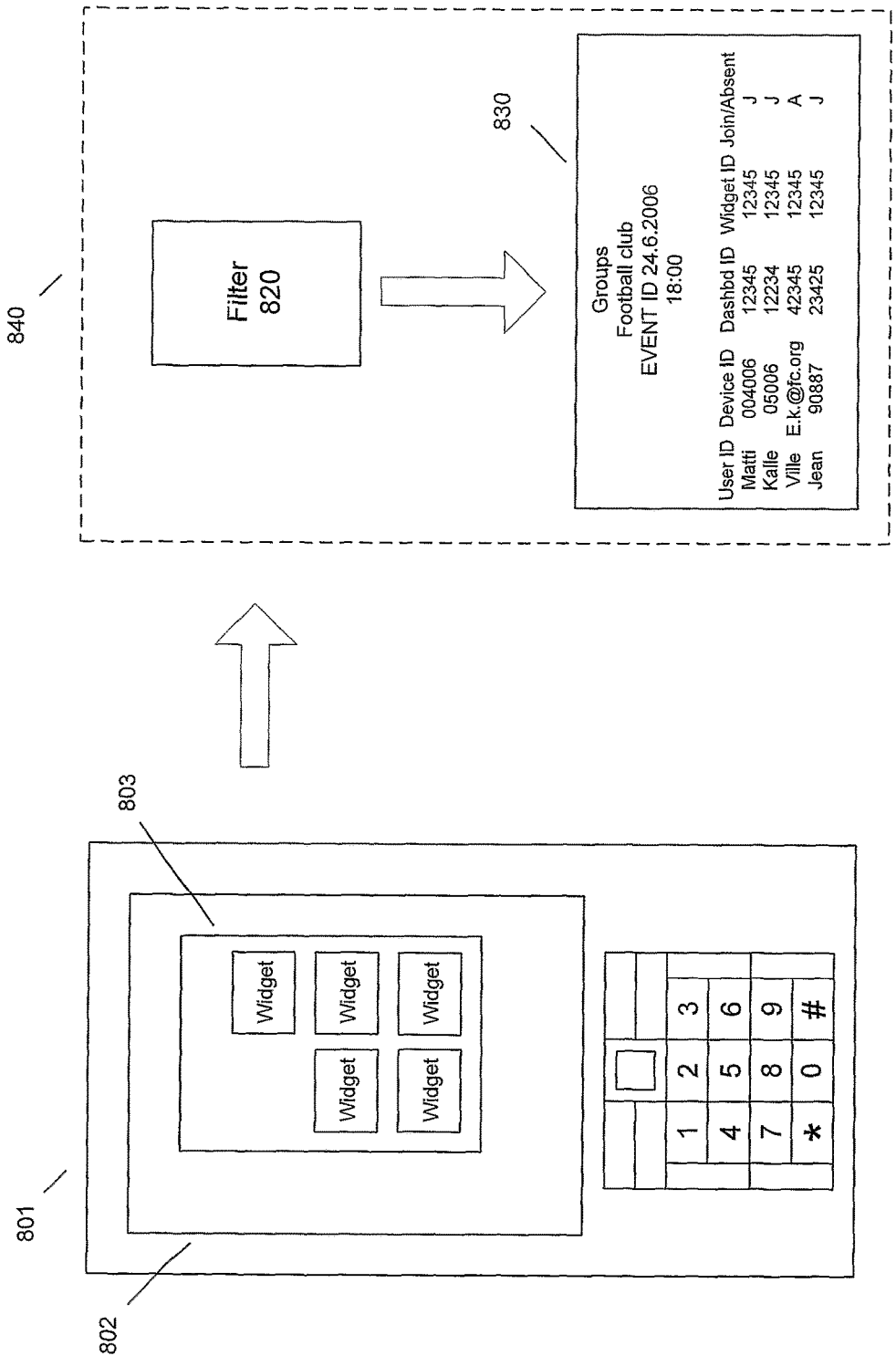
FIG. 8 illustrates an example of a mobile device with a display in which one or more illustrative embodiments may be implemented.

FIG. 7 and FIG. 8 illustrate one example of providing widgets on a mobile device. In this example, a user may join an event via a widget on a mobile device. FIG. 8 illustrates an example of a mobile device 801 with a display 802. The display contains a dashboard 803 for displaying widgets. FIG. 7 illustrates an example of a method of joining an event by selection of a widget corresponding to a widget on the mobile device 801 of FIG. 8. The method of FIG. 7 may occur, for example, in a server. Alternatively, the mobile device can be provide a light filtering function. In STEP 701, a user may select a widget corresponding to a desired event. In this example, the desired event is a football game. The user may select an option to either join or not join (i.e., be absent from) the football game (STEP 701). The user input is received at the server (STEP 702), for example, via the Internet. The request may be forwarded (STEP 703) based on the message content. For example, the request may be forwarded to a filter module 820 at a server. The filter module 820 may determine the destination of the request based on a participating group. In one example, the information forwarded to the filter module 820 may include a user identification or user identifier corresponding to the user at the mobile device 801. The forwarded information may also include a device identifier corresponding to the mobile device 801, a dashboard identifier corresponding to the dashboard 803 on the display 802 of the mobile device 801, a widget identifier corresponding widget on the dashboard 803, a group identifier corresponding to the group corresponding to the selected event, an event identifier to identify the selected event, or a payload corresponding, in this example, to a selection of a desire to join an event or to be absent from the event. The filter module 820 may determine the destination of the request received from the mobile device 801 based on the forwarded information. For example, a group identifier may be received corresponding to a football club and an event may also be identified based on a received event identifier. Thus, the user at the mobile device may fetch a desired event (STEP 704), in this example, a football game. In one example as illustrated in FIG. 8, a mobile device 801 may be in communication with a server device 840. The server may include a filter 820 as described.

In the example illustrated in FIG. 8, the football club includes various members and corresponding information for each member (830, e.g., a corresponding device id, dashboard id, or widget id). Also, the information provided may include a status of each member of the group (e.g., whether a member will join an event or be absent from the event). In this case, Matti, Kalle, and Jean will join the football event but Ville will be absent from the event (830). The user of the mobile device 801 may be added to the list of participants based on the input at the mobile device 801. Also, corresponding information, such as information as to whether the user at the mobile device 801 will join the event or be absent from the event may be included in the widget information. The information of the group and/or participants of the group may be displayed in the corresponding widget at the mobile device 801. For example, the number of participating group members who will join the event may be displayed in the corresponding widget at the mobile device 801. The number may be updated upon the addition (or subtraction) of members from the list. Hence, in this example, the latest information is provided in a corresponding widget at a mobile device for providing up-to-date relevant information to a user. In another example, the widgets on the display of the mobile device 801 (e.g., on the dashboard 803), may be scrolled in any direction on the display. For example, a user may depress a directional key or arrow key on the keypad to scroll widgets on the display or the dashboard 803. Thus, additional widgets may be displayed based on scrolling. The widgets may be scrolled in any direction including horizontally, vertically or diagonally.

In addition, the user at the mobile device 801 may update or change his status (STEP 705). For example, the user may wish to change his status from "join" to "absent". The user may thus select the proper widget and the proper choice in the widget to change his status. The member list 830 may be updated accordingly. Also, the change in status may be provided to other members of the group. As one example, the other members of the group may be informed (STEP 706) of the change of status of the user of the mobile device 801 in a multicast message. The message may be displayed in a corresponding widget on each of the mobile devices of the other members of the group.

Figure 9:
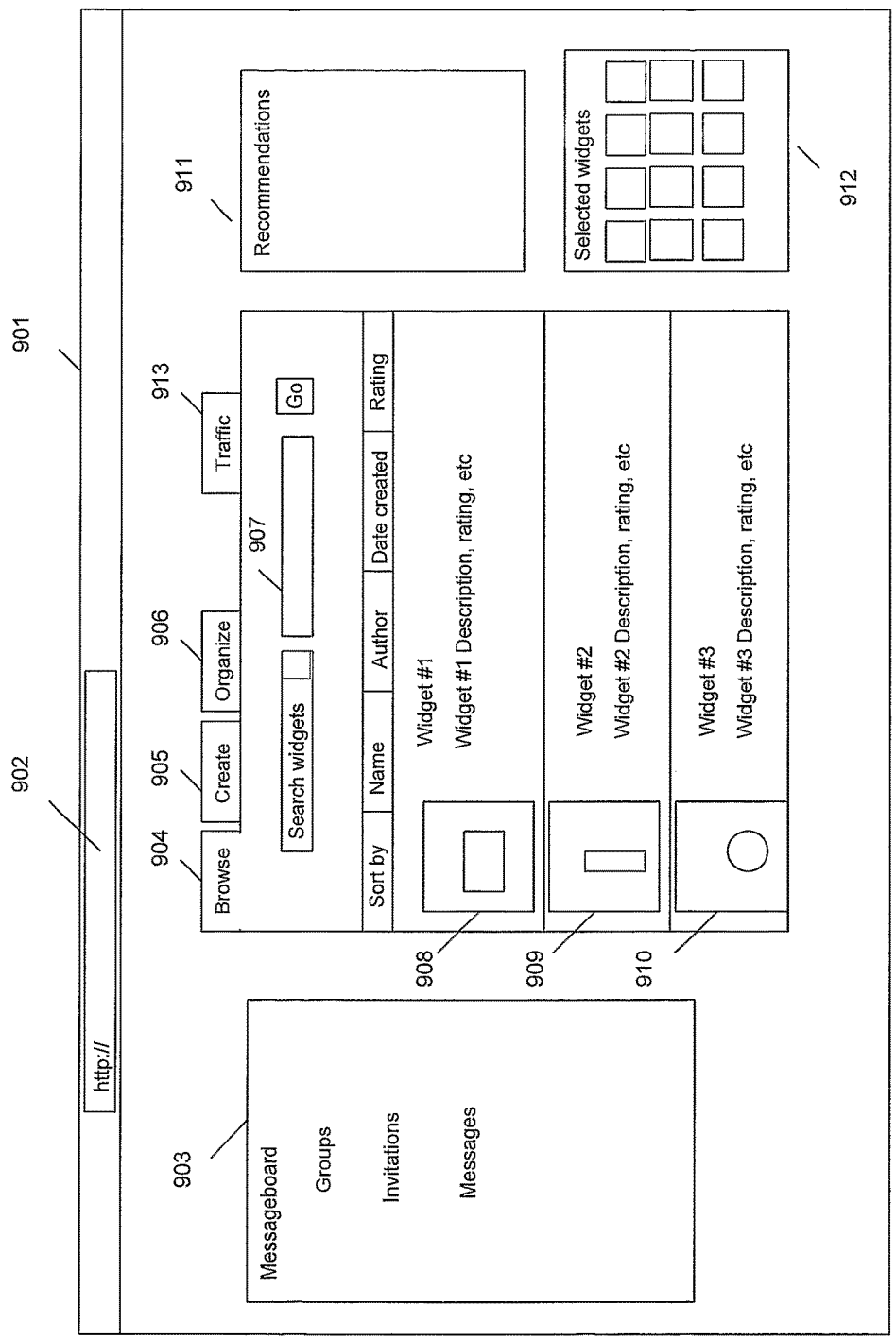
FIG. 9 illustrates an example of a web site for modifying or selecting widgets for downloading to a mobile device in which one or more illustrative embodiments may be implemented.

In another example, modifications to widgets may be made at, for example, a web site and the modifications may be sent to corresponding widgets on a mobile device. For example, changes, additions, or any modification to a widget or widgets may be entered at a web page and downloaded to a mobile device. FIG. 9 illustrates an example of a web site for modifying or selecting widgets for downloading to a mobile device. In this example, a web page 901 may display a list of widgets on a server and may provide a user with additional information associated with the widgets. In this example, a web site address may be entered into an address field 902 such that a corresponding web site 901 may be displayed. In one example, a user logs into the web site by entering a userid and password.

The web site 901 may include a message board 903 corresponding to the user. The message board 903 may provide information pertaining to any groups the user belongs to or any invitations that the user may have received. In addition, messages from group members or contacts to the user may be displayed in the message board 903. Furthermore the phone number may be added in addition to name so that user may also easily get in contact with the member.

The web site 901 may also provide a display of widgets. Widgets may be browsed by selecting an appropriate browse option 904. FIG. 9 illustrates an example in which a browse option 904 is selected such that widgets may be displayed. In this example, a search field 907 is provided such that a user may enter search criteria to search for desired widgets corresponding to the desired criteria. Based on the search, a list of matching widgets (908, 909, 910, in this example) may be displayed from which a user may choose. The displayed widgets (908, 909, 910) may further be sorted by any desired criteria. For example, the widgets (908, 909, 910) may be sorted by name, by author, by date created or by rating, etc.

The web page 901 may further provide a menu of selected widgets 912. The menu may provide thumbnail representations of selected thumbnails such that a user may keep track of selected widgets. In one example, a user may drag and drop widgets from one portion of the web page 901 to another such that widgets may be dragged to the selected widgets menu 912. In another example, selection of a widget, for example, in the browse window, may automatically add the widget to the selected widgets menu 912.

Also, the web page 901 may provide recommendations 911 for the user. In this example, recommendations for other widgets or web pages may be provided by contacts of the user or by the user and may include any desired web site, widget, or service. Recommendations may also be based on profiles corresponding to a favorites list or a list of frequently visited sites.

Figure 10:
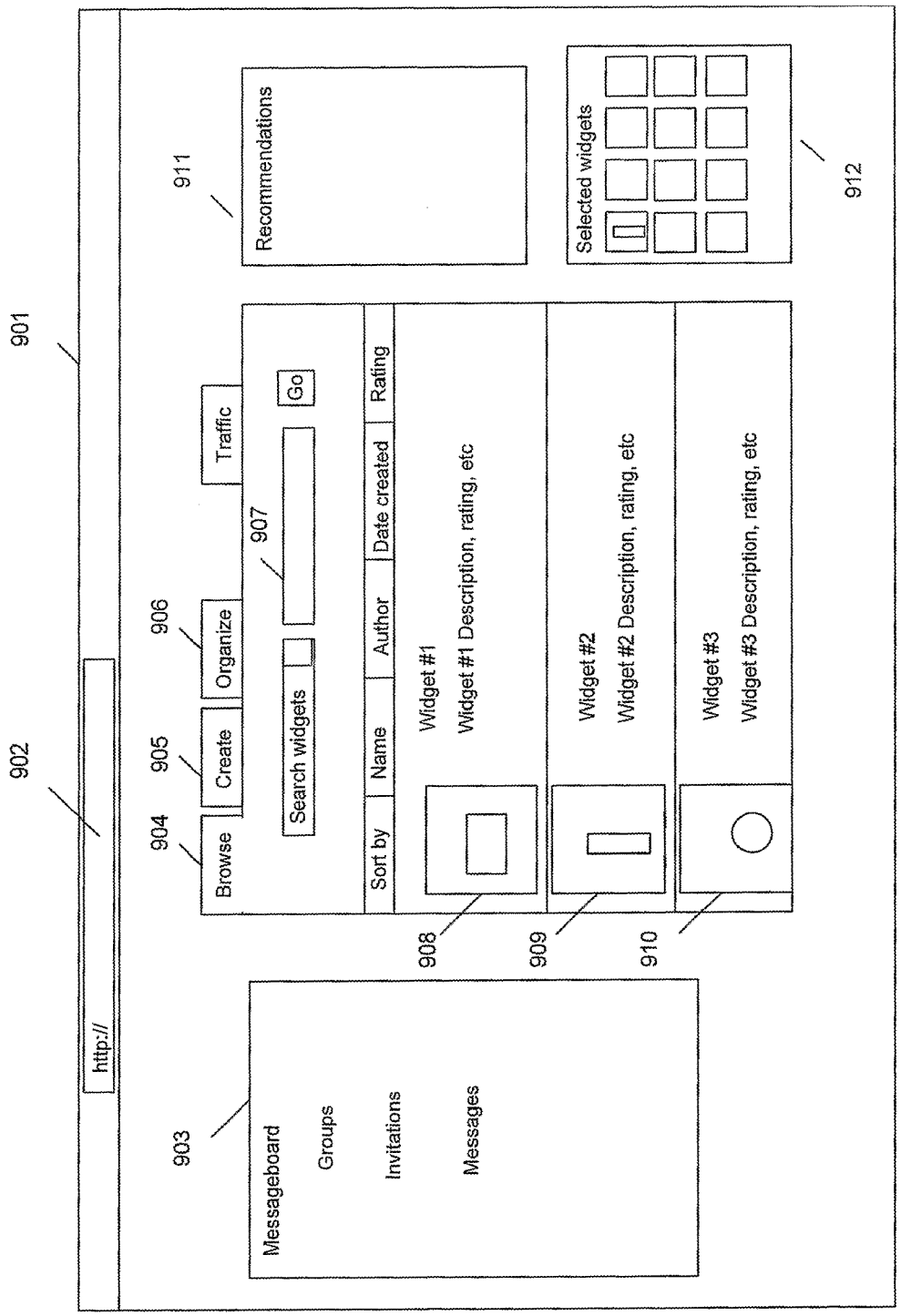
FIG. 10 illustrates the selected widgets menu including a selected widget according to at least some illustrative embodiments.

In the example illustrated in FIG. 9, the user selects the browse option 904 and further selects widget #2 (909) for inclusion in the selected widgets menu 912. FIG. 10 illustrates the selected widgets menu 912 including the selected widget (i.e., widget #2 (909) in this example).

Figure 11:
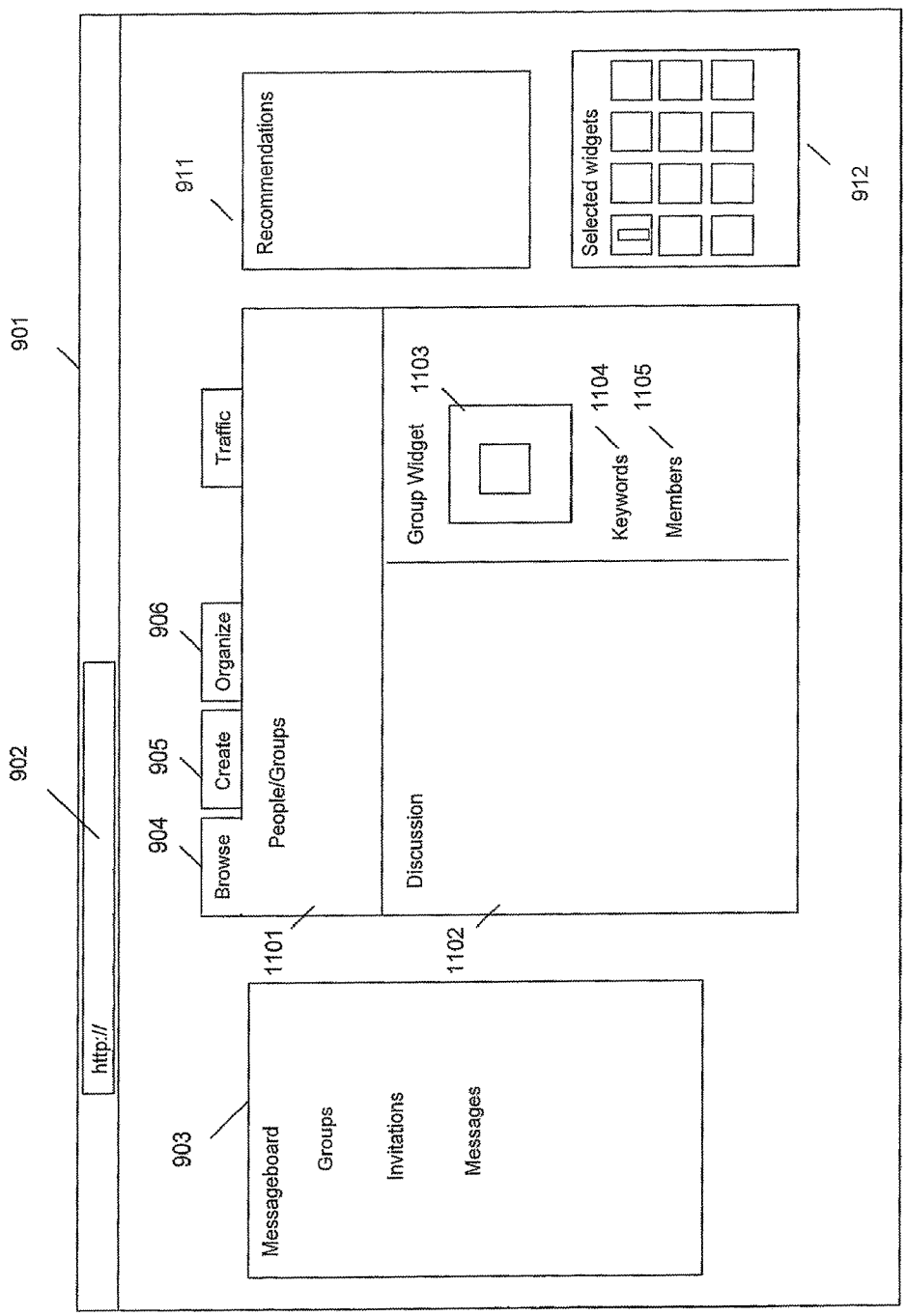
FIG. 11 illustrates an example of a group widget associated with a user group according to one or more illustrative embodiments.
Figure 12:
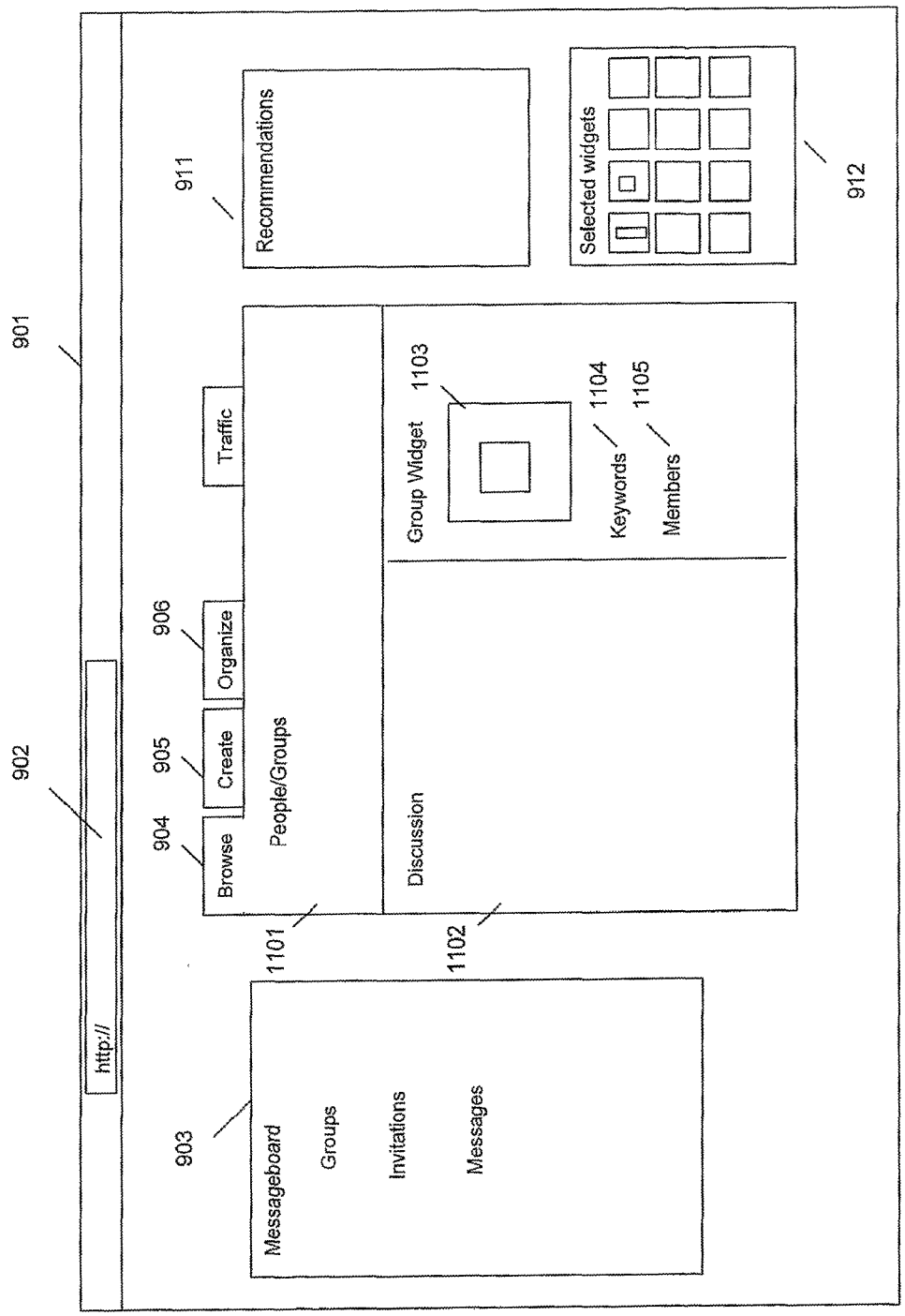
FIG. 12 illustrates the selected widgets menu after the user selects a group widget according to one or more illustrative embodiments.

FIG. 11 illustrates an example of a group widget associated with a user group. In this example, a user may receive an invitation which may be indicated in the message board 903. The user may select the invitation to display a people/groups page 1101. The people/groups page 1101 may include information on the people or groups associated with the invitation. As illustrated in the example of FIG. 11, the people/group page 1101 may include a discussion field 1102 in which messages or conversations pertaining to the group may be accessed. The people/groups page 1101 may further contain a field for displaying a widget associated with the group (i.e., a group widget 1103, in this example). The group widget 1103 may contain any information of relevance to the group. Also, keywords 1104 may be provided in the people/group page 1101 associated with the group. A list of members of the group 1105 may also be provided to inform the user of all of the other members. The group widget 1103 may be, for example, a customized group widget which the user may select for inclusion in the selected widgets menu 912. In the example illustrated in FIG. 11, the user selects the group widget 1103. FIG. 12 illustrates the selected widgets menu 912 after the user selects the group widget 1103. The group widget 1103 is added to the selected widgets menu 912.

Figure 13:
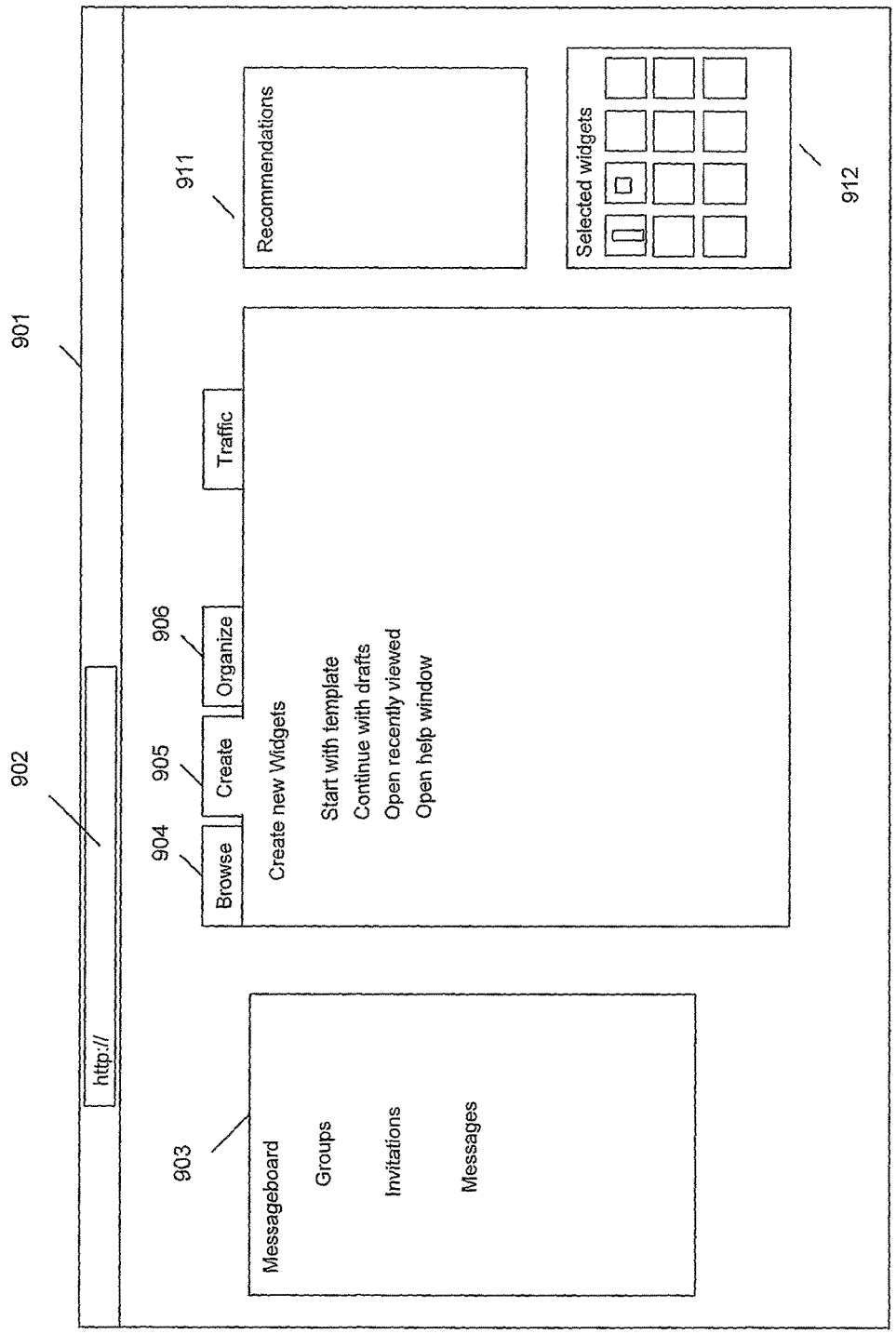
FIG. 13 illustrates an example of a page for creating a widget according to one or more illustrative embodiments.
Figure 14:
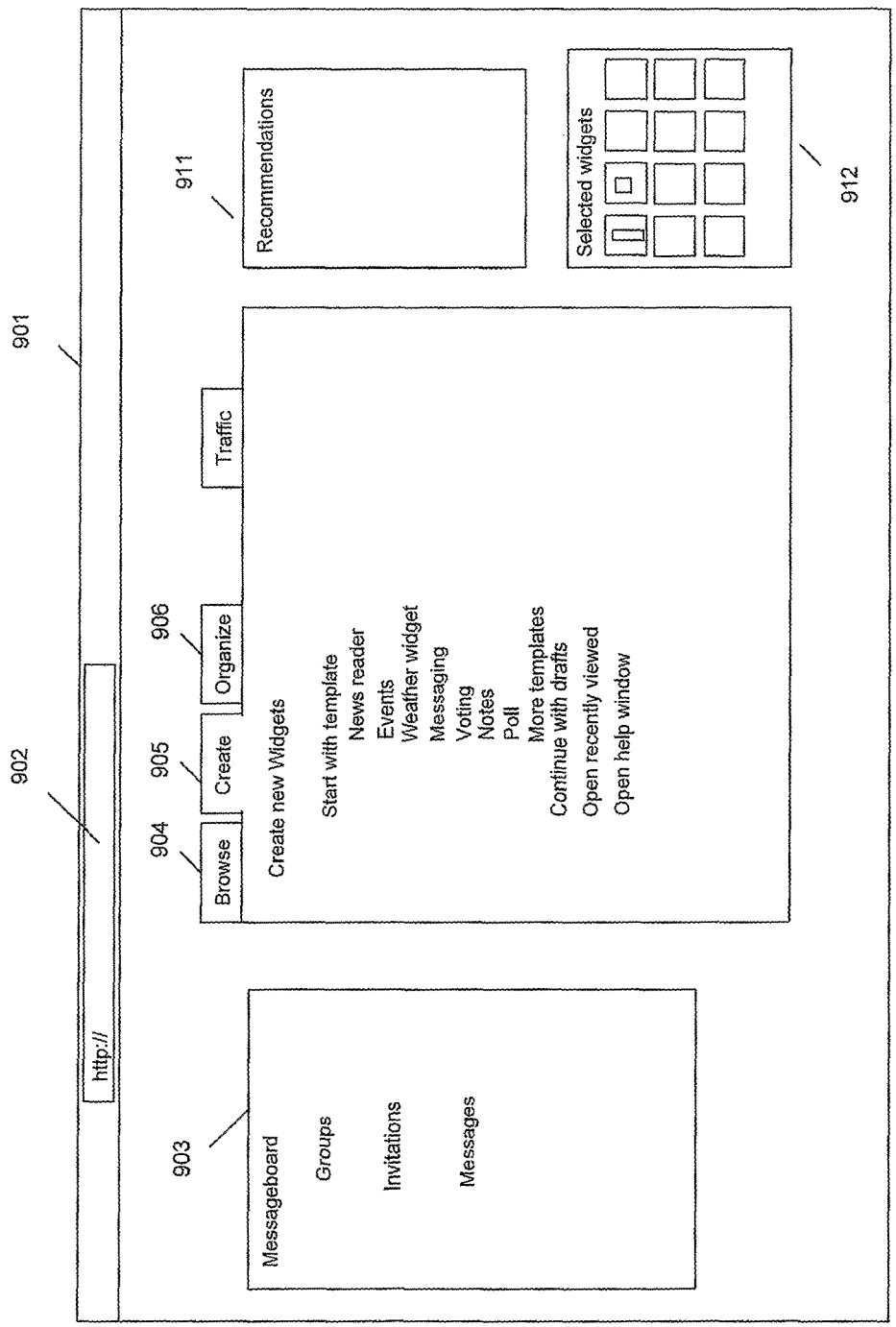
FIG. 14 illustrates an example in which an option to create a widget using a template is selected according to one or more illustrative embodiments.
Figure 15:
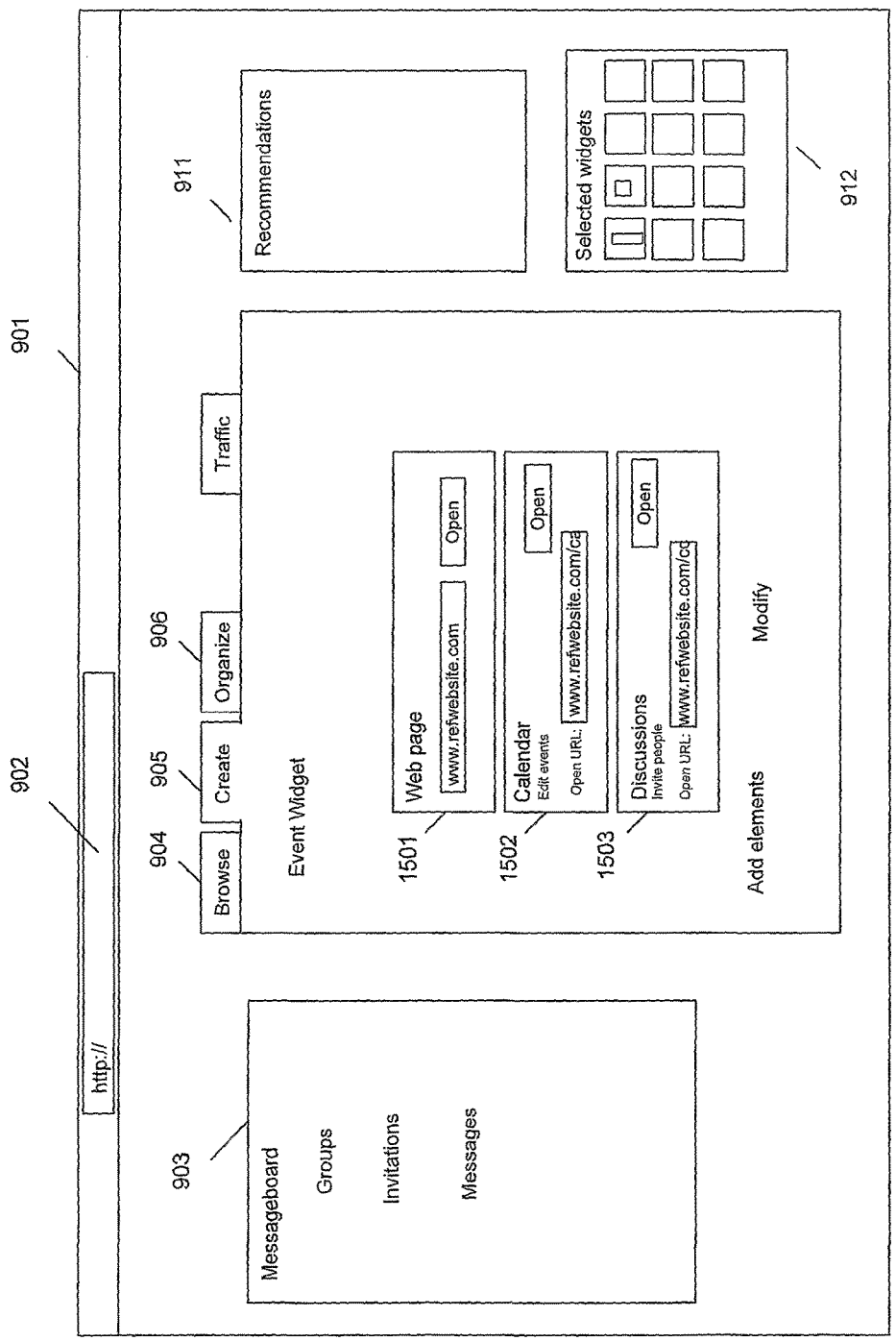
FIG. 15 illustrates an event widget template according to one or more illustrative embodiments.

In addition, the web site 901 may further provide a create option 905 which provides for creation of a widget. For example, a user may decide to create a new widget based on a new planned activity. The user may select the create option 905 which may display an editor for creation, design and implementation of a widget associated with the new planned activity. FIG. 13 illustrates an example of a page for creating a widget. In this example, a Create New Widgets option is displayed in which a user may create new widgets by a variety of methods. As examples, a user may use a template to create a widget, may save a draft of the widget to continue modifying the draft at a later time, may open a recently viewed widget or may open a help window for help in creating the widget. In one example, a template is used to create the widget. FIG. 14 illustrates an example in which an option to create the widget using a template is selected. In this example, a list of templates is provided from which a user may choose a desired template. For example, if a user selects an "events" template, an event widget template may be displayed as illustrated in FIG. 15. In this example, the events template may contain different fields. For example, the event widget template may include a component (e.g., web page component 1501) in which a user may enter a desired address of a website corresponding to the widget content. Also, the event widget template may contain additional components for providing additional information. In this example, the event widget template includes a calendar feed field 1502 and a discussion feed field 1503.

In one example, a user may wish to add a concert event by a musical group. The user may enter a URL corresponding to the musical group in the web page component 1501 and may further enter corresponding information in the calendar feed field 1502 (e.g., dates of concerts), or the discussion feed field 1503 (e.g., comments or messages relevant to the concert event or the musical group). Based on the web page URL entered in the web page component 1501, a web page may be opened corresponding to the concert or musical group. The user may select an option to incorporate information from the web page into the widget being created. The option may be located in the web page corresponding to the concert or musical group.

Figure 16:
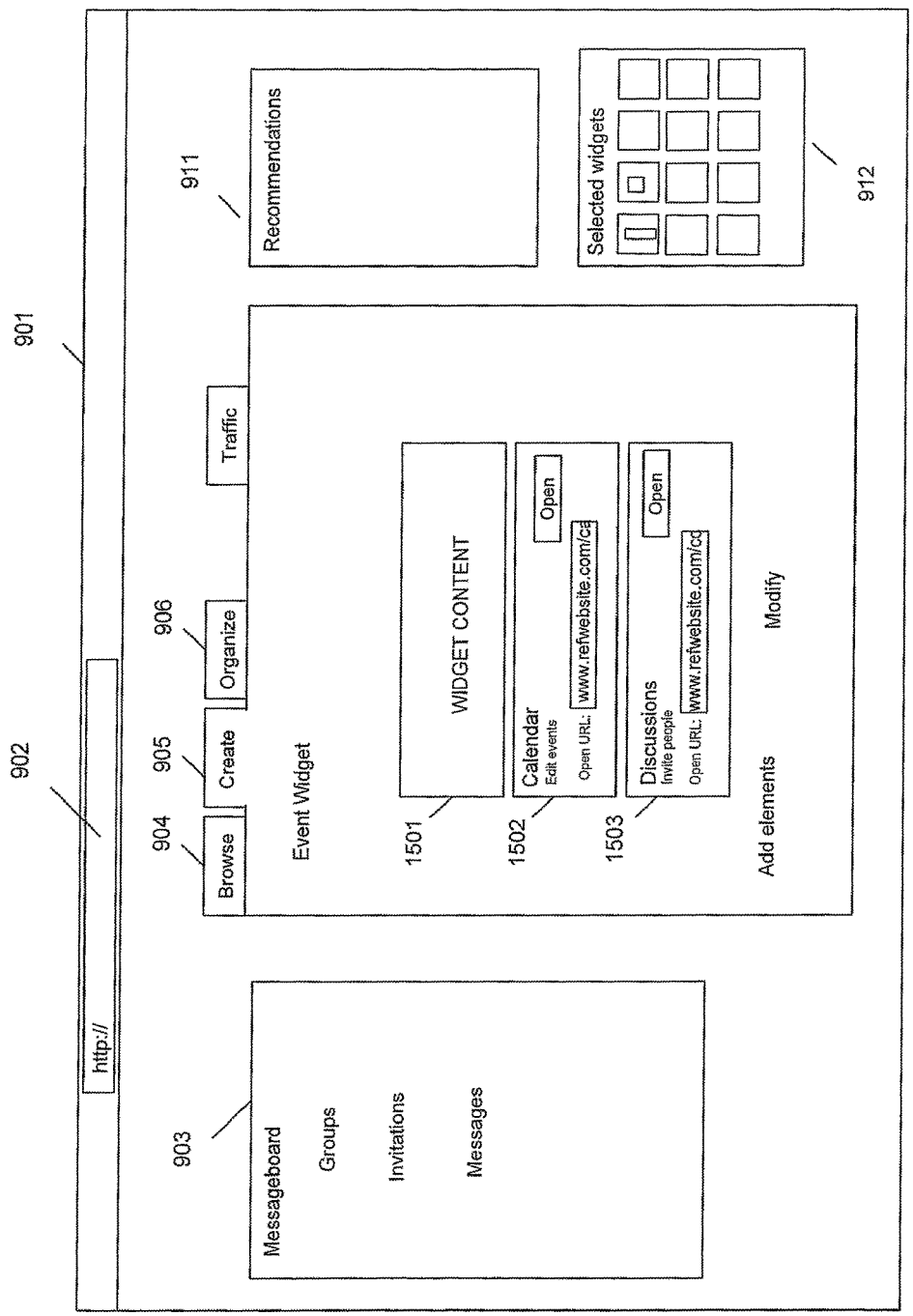
FIG. 16 illustrates an example in which widget content has been selected and inserted into the web page component according to one or more illustrative embodiments.

FIG. 16 illustrates an example in which widget content has been selected and inserted into the web page component 1501. As shown in FIG. 16, the web page component 1501 contains the widget content (depicted as "WIDGET CONTENT" in FIG. 16). In addition, other options may be provided for adding desired elements to the widget content or modifying the widget content.

Figure 17:
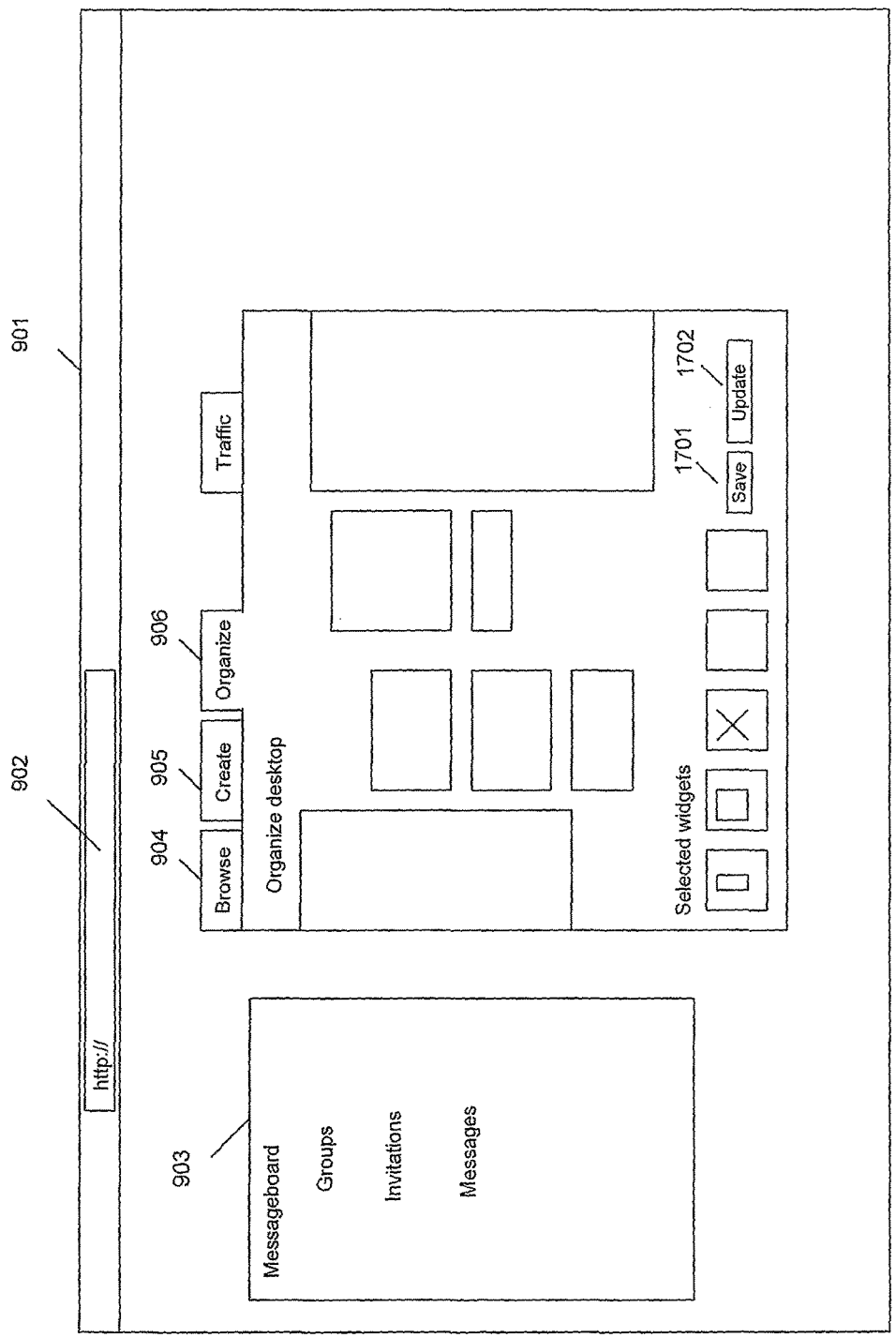
FIG. 17 illustrates an example of organization of widgets for transmission or downloading to a mobile device according to one or more illustrative embodiments.

In another example, widgets may be organized. FIG. 17 illustrates an example of organization of widgets for transmission or downloading to a mobile device. In this example, a user may select an organize option 906 to organize widgets as desired. As FIG. 17 illustrates, the organize desktop displays content available in the user's mobile device. The widgets displayed may be moved or removed as desired. Also, additional widgets may be added or settings associated with the widgets may be modified. As one example of changing widget settings, a feed URL corresponding to a widget may be altered.

After widgets are selected, modified (as desired), and/or arranged and organized, the widgets may be saved by selection of a corresponding save option 1701. Also, an option 1702 may be selected for updating the mobile device with the configured widgets. For example, a server may contain an output responsive to the input received at the update option 1702 to output the selected user interfaces (i.e., widgets) to a mobile device. In one embodiment only a couple of widgets are visible on display at the time. The other widgets can be scrolled from left to right to enable to see other widgets.

In one or more arrangements, organize option 906 may replicate or simulate the appearance of a user's mobile device user interface as well as one or more widgets displayed thereon. As such, a user may organize his or her widgets based on how they would look on the simulated user interface. Alternatively or additionally, previews of widget organizations may be downloaded to a user's device to view the simulated interface prior to committing to one design or organization or another. If a user decides on a particular widget organization, the user may select update option 1702 to load the widget configuration and/or interface design from the server to the mobile device's interface and system.

Figure 18:
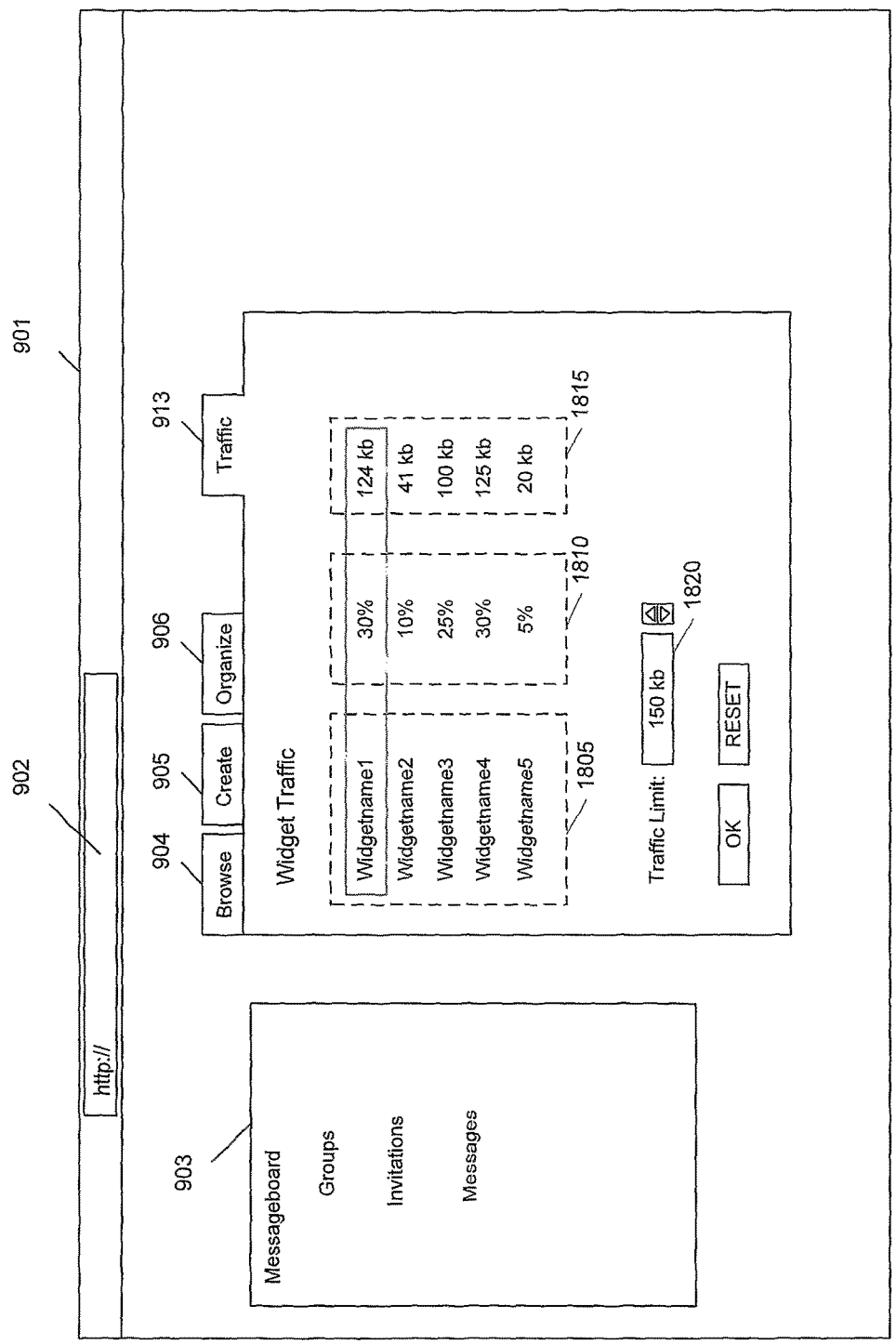
FIG. 18 illustrates an example traffic monitoring feature according to one or more aspects described herein.

FIG. 18 illustrates an interface displaying widget traffic information. In one or more configurations, traffic information may be accessed through selection of traffic tab 913. According to one or more aspects, the traffic interface may include information broken down by individual widgets. As such, column 1805 may display a list of widgets currently being used by the user or a mobile device associated therewith. The server may further display traffic percentages in column 1810. That is, the server may calculate the percentage of total traffic each widget generates and display that information. Further, column 1815 may display the actual amount of traffic generated by each of the widgets in a specified unit (e.g., kilobytes). According to one or more aspects, a user may be able to set a limit as to how much traffic a widget may generate. Accordingly, limit control bar 1820 may provided to allow adjustment of the traffic limit associated with each widget. In one example, selecting a widget may cause traffic limit control 1820 to be displayed and updated with the current limit set for the selected widget. The limit may then be modified and subsequently stored. Traffic information may be used in a variety of ways. For example, the server may send a message to a terminal if the traffic limit is exceeded. In another example, users may make widget selections based on traffic activity.

Figure 19:
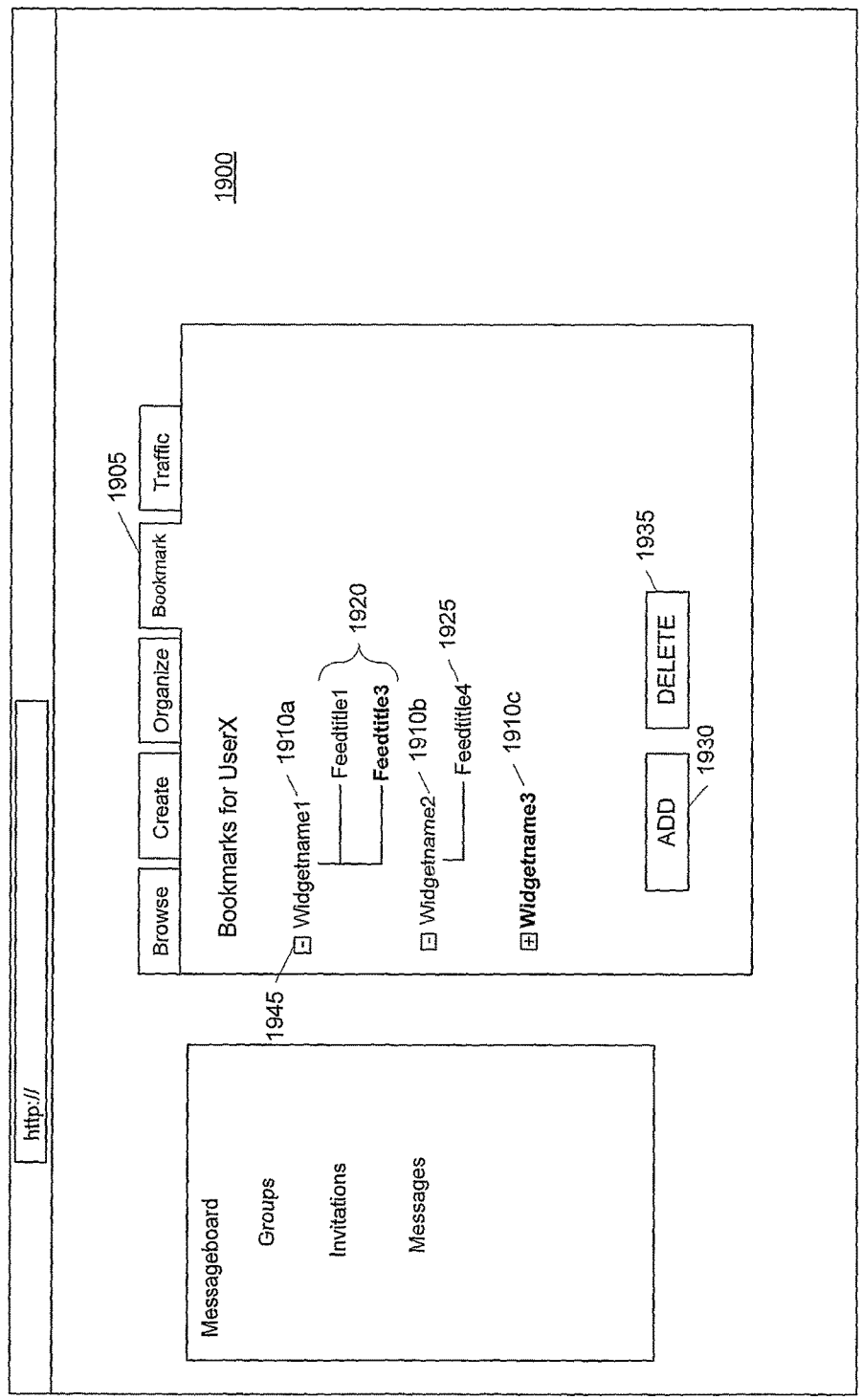
FIG. 19 illustrates an example interface for browsing bookmarks according to one or more aspects described herein.

FIG. 19 illustrates an interface in which a user may add, delete and view bookmarks. Interface 1900 provides a bookmark tab, e.g., tab 1905, allowing a user to access a list of bookmarks currently stored for and/or by the user. Bookmarks of particular feeds such as bookmarks 1920 and 1925 may be visually organized according to their associated widgets 1920*a* and 1920*b*, respectively. Bookmarks 1920 and 1925 associated with each of widgets 1910 may be revealed or hidden using an expansion control such as control 1945. Furthermore, bookmarks corresponding to feeds that contain unread information may be visually differentiated from bookmarks for feeds that have already been viewed. In one example, unread feeds may be identified by bold font while read feeds may be displayed in unbolded font. Other differentiation techniques may include using different font colors, font sizes, underlining, italicizing and the like. Selecting one of bookmarks 1920 or 1925 may open the related feed information either in the same interface (i.e., interface 1900) or, alternatively or additionally, in a different interface or window.

In addition, options 1930 and 1935 may be provided by interface 1900 to allow a user to add and delete, respectively, bookmarks from the bookmark list. Selecting add option 1930 may open another interface (not shown) for choosing available feeds and/or widgets for bookmarking. To delete a bookmark, a user may initially select the feed or widget he or she wishes to delete and subsequently select delete option 1935. Changes made to the bookmarks or bookmark list may further be loaded into a user's terminal. For example, if a user reads an unread feed, a terminal may be updated so that the feed might no longer be displayed in bold. In another example, the addition or deletion of various widgets and/or feeds from the bookmark list may be updated in the terminal as well.

Figure 20:
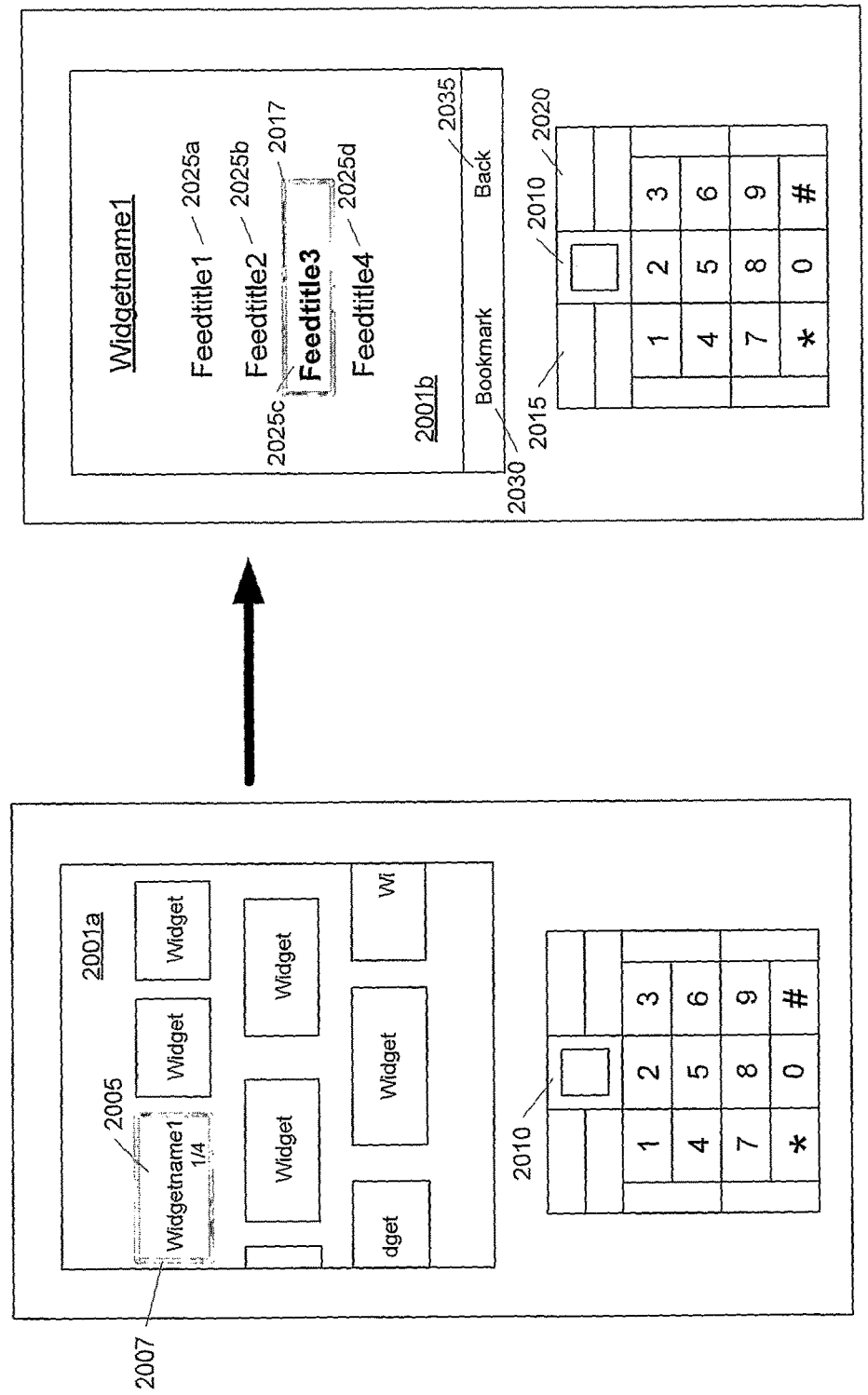
FIG. 20 illustrates interfaces associated with a terminal displaying widget information in various configurations according to one or more aspects described herein.

FIG. 20 illustrates a mobile terminal having interfaces 2001 for displaying widget and widget information. Interface 2001*a* displays a collection of widgets including widgetname1 2005. The widgets may be organized according to user preference or a default design. A user may focus on and select a widget from the set of widgets by moving a selection window to highlight a desired widget using direction pad 2010. In interface 2001*a*, widget 2005 (i.e., widgetname1) is highlighted. Beyond the name of the widget, widget 2005 may display additional information such as a number of feeds associated with widget 2005 and/or how many of those feeds are unread. For example, widget 2005 indicates that one feed is unread out of four total available feeds.

Interface 2001*b* displays a widget view after widget 2005 has been selected. In particular, interface 2001 displays the widget name, i.e., widgetname1, in addition to a list of available feeds 2025 corresponding to the widget. As with interface 2001*a*, selection window 2017 may be used to highlight and select a feed, e.g., feed 2025*c*, from feeds 2025. A user may control selection window 2017 using direction pad 2010. Other options that may be provided include bookmark option 2030 and back option 2035. Back option 2035 may allow a user to navigate to the previous interface, e.g., interface 2001. To activate back option 2035, a user may select a corresponding button, e.g., button 2020. Bookmark option 2030, on the other hand, may provide a user with a way to bookmark particular feeds. In one example, a user may highlight feed 2025*c* with selection window 2017 and select button 2015 corresponding to bookmark option 2030. Upon choosing bookmark option 2030, feed 2025*c* may be added to a bookmark list corresponding to the user and/or terminal. Alternatively or additionally, selecting feed 2025*c* using a selection button may open the feed for reading/viewing.

In another example, a dashboard may also be created by a mobile phone. In this example, a mobile phone may receive a list of selectable widgets from which the user may select desired widgets to include in the dashboard. The user can send the selections to the server and the server may generate a dashboard. In addition, the server may determine the structure of the dashboard and may send the dashboard back to the user's mobile device.

In one further embodiment a mobile device may have an integrated or an attached rfid reader or a camera. For example, a user may wish to read tags, such as bar codes, which may contain information corresponding to a URL address. The URL address may be fed into the widget. The information of the widget may be sent to the server and the server can then send up-to-date information to the mobile device based on widget information, including the tag information. Alternatively, the bar code may also be read with a camera and may further be recognized as described above.

Also, in another example, a computer-readable medium is provided containing instructions for performing the steps of selection, creation, organization, arrangement and/or downloading of user interfaces associated with desired information as described. The user interfaces and associated information may be updated and may be downloaded to and displayed on a mobile device.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended embodiments.

We claim:

1. A method comprising:
receiving at an apparatus a request for a user interface, the user interface comprising a plurality of widgets, at least one widget including information associated with a calendar event attendable by a user;
enabling user configuration of the user interface via another user interface provided by the apparatus based on the request;
causing transmittal of the configured user interface from the apparatus to a user device;
receiving a change of status of the information associated with the calendar event attendable by the user, wherein the change of status includes changes relating to planned attendance associated with the calendar event attendable by the user;
  in response to the change of the status information relating to the planned attendance of at least one other user associated with the calendar event attendable by the user causing an alert to be transmitted to the user device based on the change of status of the information; and
  in response to the alert being transmitted to the user device, updating the at least one widget on the user interface based on the user configuration to be distinguished from other widgets and to display the change of status of the information relating to the planned attendance of at least one other user associated with the calendar event attendable by the user.

2. The method of claim 1 further comprising assigning an identifier to the user interface.

3. The method of claim 1 further comprising receiving an indication of selected widgets from the another user interface.

4. The method of claim 1 wherein user configuration of the user interface via another user interface provided by the apparatus includes configuring a filter, the filter comprising criteria for transmitting an updated user interface to the user device.

5. The method of claim 1 wherein user configuration of the user interface via another user interface provided by the apparatus includes arranging the plurality of widgets for display on the user device prior to the transmittal of the configured user interface.

6. The method of claim 1 further comprising:
re-configuring the user interface based on the change of status; and
transmitting the re-configured user interface to the user device,
wherein the reconfigured user interface displays or provides an indication of the change of status.

7. The method of claim 1 wherein the request includes at least one of user identification, a user device identifier, a dashboard identifier, a widget identifier, a group ID, or an event ID.

8. The method of claim 7 wherein transmitting the configured user interface comprises transmitting information corresponding to the calendar event to the user device.

9. The method of claim 8 wherein the information corresponding to the calendar event includes a user status.

10. The method of claim 9 wherein the calendar event is associated with a plurality of participants and wherein the user status includes a status of each participant of the plurality of participants.

11. The method of claim 10 wherein the status of each participant includes an indication of participation in the calendar event.

12. The method of claim 1 wherein receiving the request comprises receiving a time for downloading the user interface and transmitting the configured user interface comprises transmitting the configured user interface after the time received.

13. The method of claim 1 wherein transmitting the configured user interface comprises transmitting the plurality of widgets in a predetermined order.

14. The method of claim 13 wherein the predetermined order is based on priority of the plurality of widgets.

15. A system comprising:
a display for enabling user configuration of a user interface, wherein the user interface comprises a list of widgets, each widget for displaying corresponding data;
a server device for storing the data corresponding to each widget;
an input to the server device for receiving a selection of a widget and for receiving a change of status of information associated with a calendar event attendable by a user, wherein the change of status includes changes relating to planned attendance associated with the calendar event attendable by the user; and
an output for (a) transmitting the selected widgets from the server device to a user device, (b) in response to the change of the status information relating to the planned attendance of at least one other user associated with the calendar event attendable by the user, causing an alert to be transmitted to the user device based on the change of status of the information, and (c) in response to the alert being transmitted to the user device, updating the at least one widget on the user interface based on the user configuration to be distinguished from other widgets and to display the change of status of the information relating to the planned attendance of at least one other user associated with the calendar event attendable by the user.

16. The system of claim 15 further comprising a creation module for creating the user interface.

17. The system of claim 15 wherein the input comprises a selection of a plurality of widgets for downloading to the user device, the server device further comprising an organize module for organizing the plurality of widgets prior to downloading.

18. The system of claim 15 wherein the display further provides a list of selected widgets.

19. The system of claim 15 further comprising a message board.

20. The system of claim 15, wherein the display further provides traffic information associated with each widget, and the updating of at least one widget on the user interface is further based on the traffic information.

21. The system of claim 15, wherein the display further provides bookmark information associated with a user of the user device.

22. The system of claim 15, wherein the input comprises a traffic limit input for specifying a maximum amount of traffic each widget is permitted to generate and the updating of at least one widget on the user interface is further based on the traffic limit input.

23. A non-transitory computer readable medium having instructions stored thereon that, when executed, cause a processor to perform a method comprising:
   receiving at an apparatus a request for a user interface, the user interface comprising a plurality of widgets, at least one widget including information associated with a calendar event attendable by a user;
   enabling user configuration of the user interface via another user interface provided by the apparatus based on the request;
   transmitting the configured user interface from the apparatus to a user device;
   receiving a change of status of the information associated with the calendar event attendable by the user, wherein the change of status includes changes relating to planned attendance associated with the calendar event attendable by the user;
   in response to the change of the status information associated with the calendar event attendable by the user reconfiguring the user interface based on the change of status of the information;
      in response to the change of the status information relating to the planned attendance of at least one other user associated with the calendar event attendable by the user causing an alert to be transmitted to the user device based on the change of status of the information; and
      in response to the alert being transmitted to the user device, updating the at least one widget on the user interface based on the user configuration to be distinguished from other widgets and to display the change of status of the information relating to the planned attendance of at least one other user associated with the calendar event attendable by the user.

24. The computer readable medium of claim 23, wherein a widget having unread data is displayed differently in the user interface than a widget not having unread data.

25. The computer readable medium of claim 23, further comprising instructions for:
   re-configuring the user interface based on the change of status; and
   transmitting the re-configured user interface to the user device,
   wherein the reconfigured user interface provides the change of status.

26. The computer readable medium of claim 23 wherein the request includes at least one of user identification, a user device identifier, a dashboard identifier, a widget identifier, a group ID, or an event ID.

27. An apparatus comprising:
   a processor; and memory configured to store computer readable instructions that, when executed, cause the processor to perform a method comprising:
   receiving at the apparatus a request for a user interface, the user interface comprising a plurality of widgets, at least one widget including information associated with a calendar event attendable by a user;
   enabling user configuration of the user interface via another user interface provided by the apparatus based on the request;
   transmitting the configured user interface from the apparatus to a user device;
   receiving a change of status of the information associated with the calendar event attendable by the user, wherein the change of status includes changes relating to planned attendance associated with the calendar event attendable by the user;
   in response to the change of the status information relating to the planned attendance of at least one other user associated with the calendar event attendable by the user, causing an alert to be transmitted to the user device based on the change of status of the information; and
   in response to the alert being transmitted to the user device, updating the at least one widget on the user interface based on the user configuration to be distinguished from other widgets and to display the change of status of the information relating to the planned attendance of at least one other user associated with the calendar event attendable by the user.

28. The apparatus of claim 27, wherein the request includes at least one of user identification, a user device identifier, a dashboard identifier, a widget identifier, a group ID, or an event ID.

* * * * *

UNITED STATES PATENT AND TRADEMARK OFFICE
CERTIFICATE OF CORRECTION

PATENT NO. : 10,146,513 B2  
APPLICATION NO. : 12/161478  
DATED : December 4, 2018  
INVENTOR(S) : Pyhalammi et al.

Page 1 of 1

It is certified that error appears in the above-identified patent and that said Letters Patent is hereby corrected as shown below:

On the Title Page

Item (75) Inventors: "Helsinki, CA (US)" should read --Helsinki (FI)--.

Signed and Sealed this  
Eighth Day of October, 2019

Andrei Iancu  
*Director of the United States Patent and Trademark Office*